United States Patent [19]
Love et al.

[11] 3,846,010
[45] Nov. 5, 1974

[54] OPTICAL WAVEGUIDE CONNECTOR

[75] Inventors: Roy E. Love, Corning; Rex L. Smith, Horseheads, both of N.Y.

[73] Assignee: Corning Glass Works, Corning, N.Y.

[22] Filed: July 5, 1973

[21] Appl. No.: 376,577

[52] U.S. Cl.......... 350/96 WG, 350/96 B, 350/96 C
[51] Int. Cl. .............................................. G02b 5/16
[58] Field of Search..... 350/96 B, 96 WG; 339/185, 339/205

[56] References Cited
UNITED STATES PATENTS
| | | | |
|---|---|---|---|
| 3,455,625 | 7/1969 | Brumley et al. | 350/96 B |
| 3,586,563 | 6/1971 | Fukami et al. | 350/96 B X |
| 3,734,594 | 5/1973 | Trambarulo | 350/96 WG X |

*Primary Examiner*—John K. Corbin
*Attorney, Agent, or Firm*—William J. Simmons, Jr.; Clarence R. Patty, Jr.

[57] ABSTRACT

An in-line connector for joining two bundles of optical waveguides. The end portions of the fibers of the first and second bundles are respectively disposed in apertures in first and second ferrules. The aperture shapes and dimensions are such that the fibers of each bundle are retained in a close packed array whereby the centers of the ends of any three contiguous fibers of a bundle are disposed at the vertices of an equilateral triangle. The two ferrules are fastened together in such a manner that the peripheries of the apertures are contiguous, thereby causing the alignment of each fiber of one bundle with a corresponding fiber of the other bundle.

10 Claims, 7 Drawing Figures

PATENTED NOV 5 1974　　　　　　　　　　　3,846,010

OPTICAL WAVEGUIDE CONNECTOR

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

Optical waveguides or bundles thereof, which are utilized in the transmission of frequencies around $10^{15}$ Hz, normally consist of an optical fiber having a transparent core surrounded by a layer of transparent cladding material having a refractive index which is lower than that of the core. Although the theory of optical waveguides has been known for some time, practical optical waveguides that do not absorb an excessive amount of transmitted light have been developed only recently. For example, U.S. Pat. No. 3,659,915 discloses a low loss optical waveguide comprising a cladding layer of fused silica and a core of fused silica doped with one or more materials that selectively increase the index of refraction of the core above that of the cladding.

To effectively utilize low loss optical waveguide bundles for communication purposes, means is required for coupling light from one bundle to another with little loss of signal, i.e., with low insertion loss. When two optical waveguides are joined end-to-end, insertion loss can result from center-to-center mismatch, angular misalignment of the fiber axes, fiber-to-fiber separation, rough end finish and Fresnel reflections. Two waveguides can be coupled with a minimum of insertion loss by employing well known techniques. This discussion of insertion loss is based on the end-to-end coupling of two fused silica optical waveguides of the type disclosed in the aforementioned U.S. Pat. No. 3,659,915 having a diameter of 5 mils and a cladding thickness of 1 mil. If misregistration of the centers of the two fibers is the only loss mechanism, a loss of about one dB occurs if the centers thereof are separated by 0.5 mil. For reasonably low insertion losses to be achieved, the fibers must therefore be registered within 0.5 mil. Due to the low numerical aperture of optical waveguides, attention must be given to the axial alignment of the two fibers. The fibers axes must be substantially aligned, i.e., they must be aligned to within 3° to keep insertion losses less than about one dB, assuming that no other loss mechanisms are operative. A rough surface finish at the end of a fiber causes random refraction and scattering. Polishing with No. 600 SiC wet grinding paper minimizes this type of loss. Since light diverges from the fiber axis as it radiates from a fiber, some light is lost if the two fibers are separated; therefore, the ends of the fibers should be maintained in virtual contact. Fiber-to-fiber separation also implies an insertion loss due to Fresnel reflections at the two glass-air interfaces. For the aforementioned fused silica optical waveguides, this amounts to 0.15 dB per interface. This loss can be eliminated by disposing between the fiber ends a layer of index matching material such as an oil or other fluid having a refractive index of 1.5.

When bundles of optical waveguide fibers are to be coupled, most of the aforementioned insertion losses can be minimized in the manner described in conjunction with the fiber-to-fiber coupling. That is, to minimize losses between two coupled fiber bundles, the axes of all fibers in both bundles should be substantially parallel, the ends of the fibers in one bundle should be virtually touching the ends of the fibers in the other bundle, the ends of all fibers should be polished, and index matching fluid should be disposed between the ends of the fibers in the two bundles. Finally, the end of a fiber in one bundle should be substantially centered with respect to a corresponding fiber in the other bundle. The present invention is directed toward this latter requirement.

Proper center-to-center alignment of corresponding fibers in two coupled bundles is probably the most difficult condition to fulfill in the reduction of insertion loss. This type of insertion loss is referred to as "packing fraction" loss since it is related to the packing fraction of the waveguide bundles, i.e., the ratio of the area of the fiber cores to the area of the entire bundle endface. For example, only 32% of the light uniformly illuminating the end of a bundle falls on fiber core areas, assuming the fibers are stacked in a close packed array and are of the aforementioned type wherein the overall diameter is 5 mils and the cladding thickness is 1 mil. If the end of such a bundle is illuminated by light from another bundle, the amount of light coupled to the receiving bundle is even less, since the packing fraction of both bundles must be taken into consideration where the two bundles are joined at a random orientation. If no attempt is made to reduce packing fraction losses, it has been found that as little as 15% of the light propagating in one bundle is transmitted to the other. Thus, for the aforementioned randon butt joint between two fiber bundles of the heretofore described 5 mil optical waveguide fibers, there is an 8 dB insertion loss. Losses of this magnitude cannot be tolerated in optical communication systems, especially in view of the fact that waveguide attenuation is only about 4 dB/km. To provide connectors having low insertion losses, packing fraction losses must be substantially reduced. Due to the small size of optical waveguide fibers and the number of fibers that are disposed in a single bundle, any attempt at connecting each individual fiber in one bundle to a corresponding fiber in the other bundle would be impractical, and yet the randon joining of two bundles gives rise to intolerable insertion loss.

SUMMARY OF THE INVENTION

It is therefore an object of the present invention to provide a low loss in line connector for use between two optical waveguide bundles.

Another object is to provide an arrangement for grouping optical waveguide fibers into a bundle whereby good registration can be obtained between fibers in two bundles joined end-to-end.

Briefly, the present invention relates to an in-line connector for joining first and second bundles having equal numbers of optical waveguide fibers or substantially equal diameters. The coupler comprises means forming a first aperture which is adapted to retain the fibers of the first bundle in a close packed array wherein the ends of the first bundle of fibers lie in a first plane that is substantially perpendicular to the axes thereof. The centers of the ends of any three contiguous fibers of the first bundle are disposed at the vertices of an equilateral triangle. The first aperture is adapted to confine the fibers of the first bundle to the smallest possible cross-sectional area in which they can be disposed. The connector also comprises means forming a second aperture which is adapted to retain the second bundle of fibers in a close packed array wherein the ends of the fibers of the second bundle lie in a second plane that is substantially perpendicular to the axes thereof. The cross-sectional shape of the second aperture is a mirror image of that of the first aperture. Means are provided for aligning the first and second aperture forming means so that the peripheries of the first and second apertures are contiguous.

DESCRIPTION OF THE PREFERRED EMBODIMENTS

Figure 1:
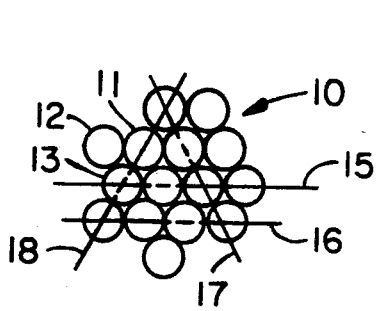
FIG. 1 is an end view of a bundle of fibers disposed in a close packed array.

The present invention is based upon the tendency of a bundle of fibers of circular cross-section and substantially equal radii to form a close packed array when compressed radially, i.e., the fibers tend to align themselves in such a manner that the centers of any three contiguous fibers of the bundle are disposed at the vertices of an equilateral triangle. Referring to FIG. 1, which is an end view of a fiber bundle 10, fibers 11, 12 and 13, for example, would be centered at the vertices of an equilateral triangle if bundle 10 were radially compressed to the extent that a close packed array was formed. Such a close packed array causes the alignment of adjacent fibers into parallel rows of fibers, the centers of which lie in planes that are separated by $r\sqrt{3}$, where $r$ is the fiber radius. Two such rows of fibers are illustrated as being centered on planes represented by lines 15 and 16. Other groups of rows are disposed in parallel planes which are angularly oriented at 60° with respect to planes 15 and 16. Two of such other planes are represented by lines 17 and 18, which are also oriented at 30° with respect to each other. The present invention takes advantage of the tendency of a compressed bundle of fibers to align in the manner illustrated in FIG. 1. Thus, the connector of the present invention comprises two termination ferrules having apertures therein, the cross-sectional shapes of which are polygons which are mirror images of one another. The adjacent sides of these polygons must intersect at angles of $p \cdot 60°$, where $p$ is 1 or 2. The cross-sectional areas of the apertures must be the smallest areas in which the fibers of the respective bundles can be disposed in order to form two close packed arrays. After the fibers are forced into the channels and the ends thereof are polished so that the ends of all of the fibers in each bundle lie in a plane that is substantially perpendicular to the axes of the end portions of the fibers, the two ferrules are joined so that the peripheries of the two channels are contiguous. A coupler constructed in this manner provides the means of registering each fiber in a bundle with a corresponding fiber in another bundle, thereby substantially eliminating packing fraction losses.

Figure 2:
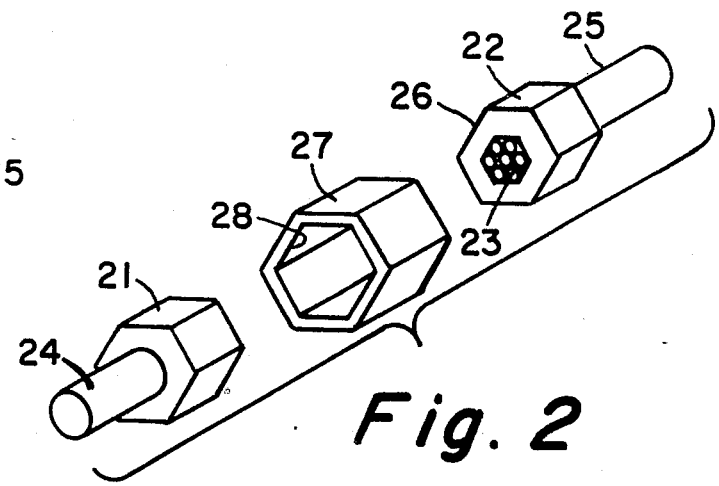
FIG. 2 is an exploded oblique view of a connector constructed in accordance with the present invention.

In the embodiment illustrated in FIG. 2, two hexagonally shaped ferrules 21 and 22 are provided with hexagonal apertures, only aperture 23 being visible. The cross-sectional shapes of the two apertures should be mirror images so that the peripheries of the channels become contiguous when the ferrules are joined. Ferrules meeting these requirements can be formed by providing a single member having a hexagonal aperture therethrough and cutting the member into two sections having apertures, the ends of which match perfectly when joined.

The jackets are stripped from the ends of two optical waveguide bundles 24 and 25, and the fibers are inserted into the apertures wherein they are forced to form a hexagonal close packed array. The fibers can be secured to the ferrules by a bonding material such as epoxy, or the bundles may be retained in the connector by crimping or clamping means known in the connector art. Since the ends of the fibers of each bundle should be virtually touching when the two ferrules are joined, the fibers may initially extend through the ferrule aperture and beyond the endface thereof. For example, the fibers of bundle 25 may initially extend beyond endface 26. The protruding ends of the fibers are then cut off with a diamond saw, and the ferrule endfaces and the corresponding ends of the fibers are ground down with grinding paper. The ends of the fibers of each bundle thus lie in the plane of the ferrule endface which should be substantially perpendicular to the fiber axes. For the sake of simplicity, an array of 7 fibers is illustrated; however, couplers constructed in accordance with the present invention can accommodate bundles having many more fibers. Ferrules 21 and 22 are then inserted into the hexagonal opening 28 of an alignment sleeve 27, thereby aligning the hexagonal channels in ferrules 21 and 22. These channels being aligned, the end of each fiber in bundle 24 becomes substantially aligned with a corresponding fiber in bundle 25, thereby substantially eliminating packing fraction insertion loss. Insertion losses due to Fresnel reflections may be eliminated by disposing a layer of index matching fluid (not shown) between the ends of the fibers of the two bundles.

Figure 3:
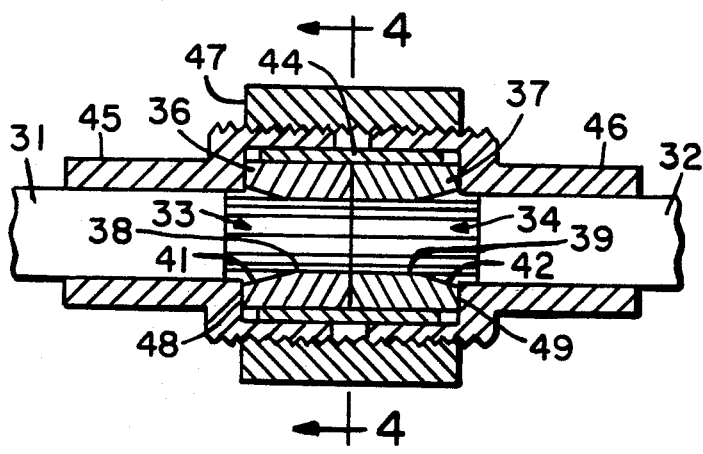
FIG. 3 is a cross-sectional view of a connector similar to the embodiment of FIG. 2.
Figure 4:
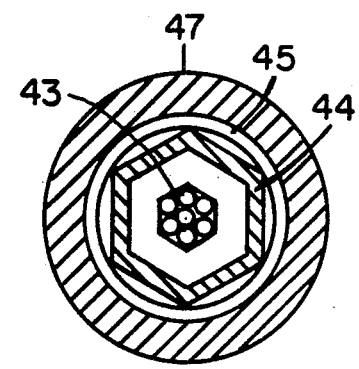
FIG. 4 is a cross-sectional view taken along lines 4—4 of FIG. 3.

The connector illustrated in FIGS. 3 and 4 employs a positive fastening mechanism in addition to the alignment and registration means discussed in connection with FIG. 2. As described hereinabove, the end portions of the jackets 31 and 32 are removed, thereby exposing optical waveguide fiber bundles 33 and 34, respectively. Ferrules 36 and 37 are provided with hexagonal apertures 38 and 39, respectively, into which bundles 33 and 34 are inserted. The insertion of bundles 33 and 34 into the apertures is facilitated by tapered sections 41 and 42 which intersect with hexagonal apertures 38 and 39, respectively. After the fiber bundles are inserted into their respective ferrules, they are secured in place by epoxy 43 and the ends of the ferrules and bundles are ground off as described above. After ferrules 36 and 37 are inserted into an alignment sleeve 44, members 45 and 46 are threaded into coupling sleeve 47, and flanges 48 and 49 engage the ferrules and urge the ends thereof into contact. The ends of bundles 33 and 34 are therefore also urged into contact, each fiber in bundle 33 being centered with a corresponding fiber in bundle 34.

For connectors designed in accordance with the present invention to substantially eliminate packing fraction loss, aperture dimensions must be precisely controlled, since a closed packed array minimizes the area envelope defined by a given number of fibers. If the aperture dimensions are precisely controlled, a specified number of fibers will fit therein only if the fiber stacking arrangement is closed packed. In addition to the hexagonal aperture shape discussed in connection with FIGS. 2–4, apertures may be in the shape of equilateral triangles, 60° corner parallelograms or any linear juxtaposition of the aforementioned shapes provided that all fibers in the array satisfy the previously mentioned requirement that the ends of any three contiguous fibers are centered at the apices of an equilateral triangle. Aperture dimensions can be expressed in terms of fiber diameter and number of fibers enclosed. The pertinent geometrical features associated with apertures in the form of a hexagon, triangle and parallelogram will be considered in connection with the diagrams of FIGS. 5, 6 and 7, respectively.

Figure 5:
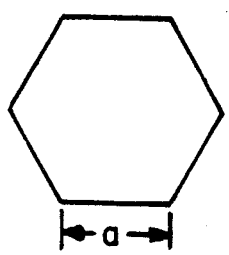
FIGS. 5, 6 and 7 are diagrams of geometrical shapes which can be employed as optical waveguide fiber containing apertures.

Referring to FIG. 5, N fibers of diameter d will just fit into the hexagonal aperture wherein the length a of each side is given by $a = (n - \frac{1}{2})d$ and N is given by $N = 3n^2 - 3n + 1$ where $n$ is an integer greater than one. For example, if $d$ is 5 mils and $n$ is set equal to 3, then $a = 12.5$ mils and $N = 19$ fibers. The number of fibers that will just fit into an aperture of hexagonal cross-section are 7, 19, 37, 61, 91, 127, etc.

Figure 6:
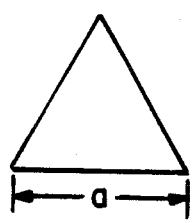
Figure 7:
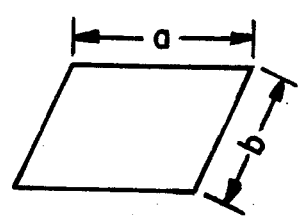

If the cross-sectional shape of the aperture is an equilateral triangle as illustrated in FIG. 6, the total number of fibers N that will just fit therein is given by $N = n(n+1)/2$ and the length a of a side is given by $a = (n + 0.732)d$ where $n$ is an integer greater than one and is also the number of fibers on a side. The total number of fibers N can be 3, 6, 10, 15, 21, 28, 36, 45, etc. An aperture having a cross-sectional shape in the form of a parallelogram is illustrated in FIG. 7. The length a of one pair of sides is given by $a = (n + 0.1547)d$ where $n$ is the number of fibers along each of those sides, and the length b of the other pair of sides is given by $b = (m + 0.1547)d$ where $m$ is the number of fibers along each of those sides. The total number of fibers N that can just fit into this array is therefore given by $N = nm$ The outer cross-sectional shape of the ferrule is arbitary, but registration rquirements might favor triangles, rectangles or regular polygons. The outer ferrule surface could also be circular, but if such a shape were used, some means of registration other than a sleeve would be required. For example, two ferrules having outer surfaces of circular cross-section could be provided with slots which could be aligned by a key to provide proper alignment of the apertures in which the waveguide fibers are disposed.

I claim:

1. An in-line connector for joining first and second bundles having equal numbers of optical waveguide fibers of substantially equal diameters, said coupler comprising means forming a first aperture which is adapted to retain the fibers of said first bundle in a close packed array wherein the ends of said first bundle of fibers lie in a first plane that is substantially perpendicular to the axes thereof, the centers of the ends of any three contiguous fibers of said first bundle being disposed at the vertices of an equilateral triangle, said first aperture being adapted to confine the fibers of said first bundle to the smallest possible cross-sectional area in which they can be disposed, means forming a second aperture which is adapted to retain said second bundle of fibers in a close packed array wherein the ends of said fibers of said second bundle lie in a second plane that is substantially perpendicular to the axes thereof, the cross-sectional shape of said second aperture being a mirror image of that of said first aperture, and means for aligning said first and second aperture forming means so that the peripheries of said first and second apertures are contiguous.

2. A connector in accordance with claim 1 further comprising means for urging the end of said first bundle toward the end of said second bundle.

3. A connector in accordance with claim 2 wherein the walls of said aperture forming means have planar sides that intersect at an angle of $p \cdot 60°$ wherein $p=1$ or 2.

4. A connector in accordance with claim 3 wherein said first and second apertures are in the shape of a hexagon, and wherein each bundle contains N fibers where $N = 3n^2 - 3n + 1$ and where the length a of each side of said hexagonal aperture is determined by the equation $a = (n - \frac{1}{2})d$, where $n$ is an integer greater than 1.

5. A connector in accordance with claim 3 wherein each channel is in the shape of an equilateral triangle, the length a of each side of which is given by the equation $a = (n + 0.732)d$, and the number N of fibers in each of said first and second bundles is given by the equation $N = \frac{1}{2}n(n+1)$ where n is an integer greater than 1.

6. A connector in accordance with claim 3 wherein said first and second apertures are in the shape of a 60° corner parallelogram having two sides of length a along which n fibers are disposed and two sides of length b along which m fibers are disposed, the length a being $(n + 0.1547)d$ and the length b being $(m + 0.1547)d$, the total number N of fibers in each bundle being mn.

7. A connector in accordance with claim 1 wherein said first and second aperture forming means comprise first and second ferrules in which said first and second apertures are respectively disposed, said first and second ferrules having endfaces that lie in said first and second planes, respectively.

8. A connector in accordance with claim 7 wherein the cross-sectional shape of the outer surface of said first ferrule is a mirror image of that of said second ferrule, said connector further comprising an alignment sleeve having an aperture, the shape of which corresponds to the outer surfaces of said first and second ferrules, said alignment sleeve maintaining said first and second ferrules in alignment.

9. A connector in accordance with claim 8 further comprising means for urging the ends of the fibers of said first bundle toward the ends of said fibers of said second bundle.

10. A connector in accordance with claim 9 further comprising means for facilitating the insertion of said first and second bundles into said first and second apertures, respectively.

* * * * *